(12) United States Patent
Merrifield et al.

(10) Patent No.: US 7,093,850 B2
(45) Date of Patent: Aug. 22, 2006

(54) INSTRUMENT PANEL WITH INTEGRAL HIDDEN DOOR COVER AND METHOD OF MANUFACTURE THEREOF

(75) Inventors: Richard Allen Merrifield, Spring Valley, OH (US); Charles J. Scheib, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 242 days.

(21) Appl. No.: 10/714,162

(22) Filed: Nov. 14, 2003

(65) Prior Publication Data

US 2005/0104337 A1    May 19, 2005

(51) Int. Cl.
B60R 21/20    (2006.01)

(52) U.S. Cl. .................... 280/728.3; 280/732

(58) Field of Classification Search .......... 280/728.3, 280/732, 731; 180/90
See application file for complete search history.

(56) References Cited

U.S. PATENT DOCUMENTS

| | | | |
|---|---|---|---|
| 3,756,617 A | 9/1973 | Brown ................. 280/150 AB |
| 4,120,516 A | 10/1978 | Takamatsu et al. ......... 280/728 |
| 4,893,833 A | 1/1990 | DiSalvo et al. ............. 280/732 |
| 4,968,057 A | 11/1990 | Rafferty ..................... 280/731 |
| 4,989,896 A | 2/1991 | DiSalvo et al. ............. 280/732 |
| 4,991,271 A | 2/1991 | Bauer et al. .................. 24/590 |
| 4,991,870 A | 2/1991 | Beusterien et al. ......... 280/732 |
| 5,072,967 A | 12/1991 | Batchelder et al. ......... 280/732 |
| 5,076,312 A | 12/1991 | Powell ..................... 137/68.1 |
| 5,080,393 A | 1/1992 | Dixon et al. ................ 280/732 |
| 5,082,310 A | 1/1992 | Bauer ......................... 280/732 |
| 5,131,678 A | 7/1992 | Gardner et al. ............. 280/732 |
| 5,217,244 A | 6/1993 | Bauer ......................... 280/728 |
| 5,222,760 A | 6/1993 | Rafferty ..................... 280/728 |
| 5,342,088 A | 8/1994 | Bauer ..................... 280/728 B |
| 5,375,875 A | 12/1994 | DiSalvo et al. ......... 280/728 B |
| 5,375,876 A | 12/1994 | Bauer et al. ............ 280/728 B |
| 5,421,608 A | 6/1995 | Parker et al. ............. 280/728.3 |
| 5,447,328 A | 9/1995 | Iannazzi et al. ......... 280/728.3 |
| 5,478,106 A | 12/1995 | Bauer ..................... 280/728.3 |
| 5,496,059 A | 3/1996 | Bauer ..................... 280/728.3 |
| 5,522,616 A | 6/1996 | Bauer et al. ............. 280/728.2 |
| 5,611,564 A | 3/1997 | Bauer ..................... 280/728.3 |
| 5,632,914 A * | 5/1997 | Hagenow et al. ...... 219/121.71 |
| 5,698,283 A * | 12/1997 | Yamasaki et al. ............. 428/43 |
| 5,738,367 A | 4/1998 | Zichichi et al. .......... 280/728.3 |
| 5,744,776 A | 4/1998 | Bauer ..................... 219/121.7 |
| 5,757,727 A | 5/1998 | Hanafy et al. .............. 367/155 |
| 5,797,619 A | 8/1998 | Bauer ..................... 280/728.3 |
| 5,883,356 A | 3/1999 | Bauer et al. ........... 219/121.62 |
| 6,070,901 A | 6/2000 | Hazell et al. ............ 280/728.3 |
| 6,079,733 A | 6/2000 | Towler .................... 280/728.3 |
| 6,224,090 B1 * | 5/2001 | Lutze et al. ............. 280/728.3 |

(Continued)

Primary Examiner—Paul N. Dickson
Assistant Examiner—Drew J. Brown
(74) Attorney, Agent, or Firm—Scott A. McBain (57) ABSTRACT

An instrument panel and method of making an instrument panel for use in a vehicle having a passenger side airbag module is disclosed. The instrument panel comprising: a first outer layer having a show surface and an inner surface; an intermediary layer disposed on the inner surface; an inner layer disposed on the intermediary layer; a plurality of cuts in the show surface, the plurality of cuts defining a deployable door in the instrument panel and the plurality of cuts in the show surface are not visually perceivable. The plurality of cuts being in the show surface of the first outer layer and the plurality of cuts do not extend all the way through the first outer layer.

12 Claims, 5 Drawing Sheets

U.S. PATENT DOCUMENTS

| | | | |
|---|---|---|---|
| 6,247,722 B1 | 6/2001 | Brodi et al. | 280/728.3 |
| 6,267,918 B1 | 7/2001 | Bauer | 264/400 |
| 6,294,124 B1 | 9/2001 | Bauer | 264/400 |
| 6,357,788 B1* | 3/2002 | Kreile | 280/728.3 |
| 6,406,056 B1* | 6/2002 | Yokota | 280/728.2 |
| 6,423,933 B1 | 7/2002 | Nicholas et al. | 219/121.7 |
| 6,453,535 B1 | 9/2002 | Nicholas | 29/413 |
| 6,533,314 B1 | 3/2003 | Merrifield et al. | 280/728.3 |
| 6,692,019 B1* | 2/2004 | Sommer | 280/732 |
| 6,716,519 B1* | 4/2004 | Ueno et al. | 428/308.4 |
| 6,737,607 B1 | 5/2004 | Nicholas et al. | 219/121.7 |
| 6,753,057 B1* | 6/2004 | Gardner, Jr. | 428/43 |
| 6,808,197 B1 | 10/2004 | Bauer et al. | 280/728.3 |
| 6,848,707 B1 | 2/2005 | Bauer et al. | 280/728.3 |
| 7,000,942 B1* | 2/2006 | Lutze et al. | 280/728.3 |
| 2003/0230875 A1* | 12/2003 | Lutze et al. | 280/728.3 |
| 2004/0164531 A1 | 8/2004 | Riha et al. | 280/732 |
| 2006/0024476 A1 | 2/2006 | Leland et al. | 428/137 |

\* cited by examiner

FIG. 9 under circumstances described above, the instrument panel being described here has the capability to permit the deployment of the passenger side airbag cushion without the use of a separate attached door that covers an opening formed in the instrument panel. Accordingly, and as will be discussed herein, the instrument panel cover is provided with the means to allow deployment of the airbag cushion therethrough without the use of a separate door that is secured to the instrument panel after manufacture.

INSTRUMENT PANEL WITH INTEGRAL HIDDEN DOOR COVER AND METHOD OF MANUFACTURE THEREOF

TECHNICAL FIELD

The present invention relates generally to an instrument panel used in a vehicle having an inflatable cushion or airbag module, and more particularly to an instrument panel cover having an integral hidden door and the method of manufacture thereof.

BACKGROUND

Vehicles are now equipped with some type of inflatable cushions or airbag modules and other vehicle components have been modified to accommodate the use of such systems. For example, most passenger side airbag modules are disposed within and behind an instrument panel which extends across at least a portion of the width of a vehicle compartment. During assembly and/or manufacture, an instrument panel in a vehicle having a passenger side airbag module requires a discrete door which covers an opening formed in the instrument panel for the inflatable cushion to deploy through upon actuation of the airbag module. This separate door is designed to open in response to the force of the expanding inflatable cushion. In other words as the pressure in the inflatable cushion increases, the volume of the cushion increases and applies a force to a portion of the door wherein the door selectively separates from the remaining portion of the instrument panel to permit the inflatable cushion to deploy therethrough.

Typically, the manufacture of the instrument panel involves forming an opening in the instrument panel adjacent to the location of the airbag module. The opening is then covered by a separate door which is secured to the instrument panel and faces the occupants of the vehicle. Thus, the instrument panel itself is manufactured in view of the shape and size of the door and the door is separately manufactured and installed in the instrument panel using known techniques. However, the outer periphery of such a door is clearly visible to the vehicle occupant and may create an unpleasing appearance to the instrument panel.

Due to ongoing desires for improving the aesthetics of the passenger compartment, it is desirable to provide aesthetically pleasing, functional alternatives to the conventional instrument panels having a separate door covering the airbag module.

SUMMARY OF THE INVENTION

According to the present invention, an instrument panel having a hidden deployment region or deployable door integrally formed in an instrument panel cover by a forming process is provided. More specifically, the deployment door is defined by a plurality of cuts or scores in an exterior surface of the instrument panel wherein the plurality of cuts or scores are not perceivable to the naked eye. Moreover, the plurality of cuts or scores do not extend into a surface area where an intermediary layer of the instrument panel cover is applied.

The scores will define weakened portions of the instrument panel such that the force of the inflating cushion will cause deployment of the door when the door separates along a plurality of the scores to thereby provide an opening for the inflating air bag cushion to deploy therethrough. The deployment region may be defined by any number of scores and therefore may have a variety of patterns, including but not limited to an "H" pattern, "U" pattern, and "I" pattern and any equivalents thereof wherein a deployable door is defined.

An instrument panel and method of making an instrument panel for use in a vehicle having a passenger side airbag module is disclosed. The instrument panel comprising: a first outer layer having a show surface and an inner surface; an intermediary layer disposed on the inner surface; an inner layer disposed on the intermediary layer after it is disposed on the inner surface; a plurality of cuts in the show surface, the plurality of cuts defining a deployable door in the instrument panel and the plurality of cuts in the show surface are not visually perceivable. The plurality of cuts do not extend through to the intermediary layer therefore the application of the intermediary layer to the inner surface of the first outer layer will not make contact with the plurality of cuts.

BRIEF DESCRIPTION OF THE DRAWINGS

The present invention will now be described, by way of example only, with reference to the accompanying drawings in which.

DETAILED DESCRIPTION OF EXEMPALRY EMBODIMENTS

Figure 1:
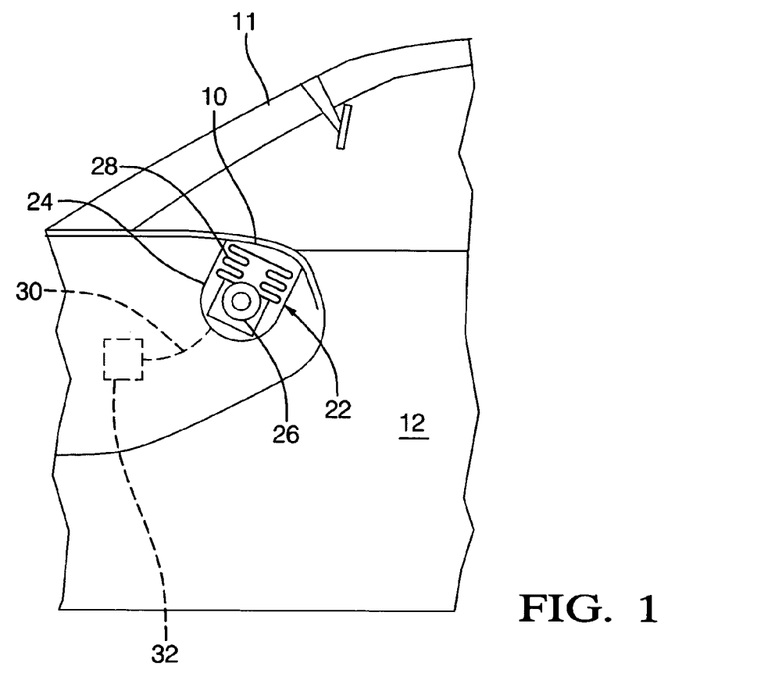
FIG. 1 is a partial cross sectional view of a vehicle interior.
Figure 2:
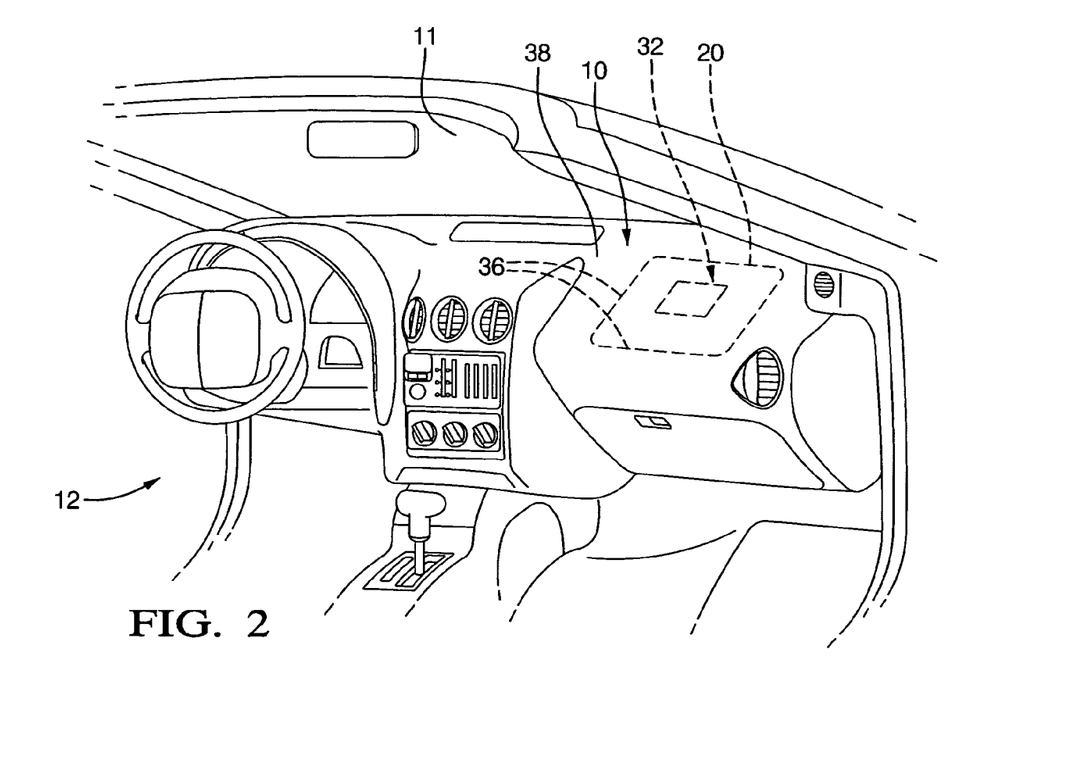
FIG. 2 is a partial cross perspective view of a vehicle interior.
Figure 3:
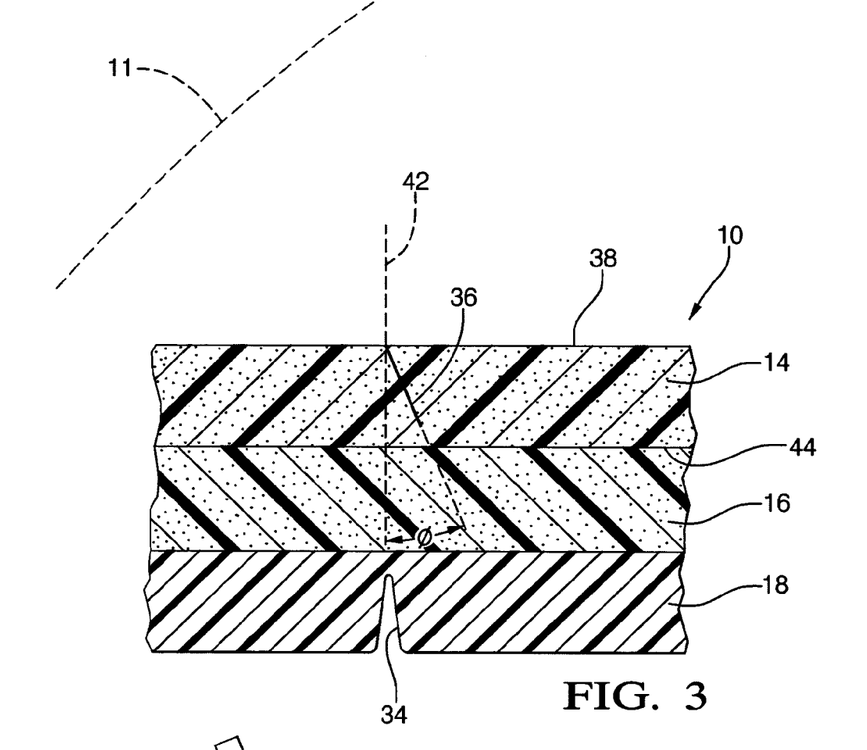
FIG. 3 is a cross sectional view of a portion of an instrument panel formed in accordance with exemplary embodiments of the present invention.

Referring now to FIGS. 1–3, an instrument panel embodying exemplary embodiments of the present invention is illustrated and generally indicated at 10. The instrument panel 10 is assembled into a vehicle passenger compartment 12 partially shown in FIG. 2. The instrument panel is generally disposed beneath a windshield 11 and extends across substantially the entire width of the passenger compartment 12.

In accordance with exemplary embodiments of the present invention and as will be described in greater detail hereinafter, the instrument panel comprises a first outer layer 14, an intermediate layer 16 and an inner layer 18. The instrument panel further comprises a deployment region 20 formed therein. The deployment region is defined by a plurality of cuts or scores in both the first outer layer and the inner layer or alternatively cuts are only made in the outer layer. The deployment region is intended to be in the general area corresponding to a passenger side airbag module 22. The passenger side airbag module is located and deployed therethrough during actuation of the passenger side airbag module under predetermined deployment conditions. Airbag module 22 further comprises a housing 24, an inflator 26 and an inflatable cushion 28 wherein the inflator inflates the inflatable cushion 28 in response to a signal 30 received from a sensing or control module 32 configured to determine if an activation event is occurring. The control module receives signals from a plurality of sensors disposed throughout the vehicle.

The instrument panel is formed of any number of suitable materials and in an exemplary embodiment; the instrument panel is formed of thermoplastic materials. For example, suitable thermoplastic materials include but are not limited to polyethylene based polyolefin elastomer or polypropylene based thermoplastic elastomer and equivalents thereof.

Preferred materials are those materials which have the desired characteristics of strength, flexibility, and finished appearance and feel for use as an instrument panel 10. The instrument panel is mounted so that an outer surface is visible to a vehicle occupant and an inner surface forms a contact surface for the inflatable cushion.

It is, of course, understood that the passenger side airbag module and the configuration of the instrument panel illustrated in FIG. 1 are provided as examples and various other configurations of the instrument panel and the airbag module are contemplated thus, the present invention is not intended to be limited to the specific configurations illustrated in FIG. 1.

In accordance with an exemplary embodiment of the present invention first outer layer 14 comprises an interior show surface of the instrument panel. As described herein shown surface is intended to include the surface of the instrument panel that is exposed to the vehicle interior and its occupants. In an exemplary embodiment, outer layer 14 is formed from a polyurethane material or equivalents thereof. Also, intermediate layer 16 is formed from a polyurethane foam material that is applied to first outer layer 14. The scores and cuts of first outer layer are formed in accordance with exemplary embodiments of the present invention. Inner layer 18 is formed from a thermoplastic material in accordance with technologies know to those skilled in the related arts.

In addition, inner layer 18 is provided with a plurality of scores 34 which are positioned to align with a plurality of cuts 36 in first outer layer 14. The plurality of cuts 36 being provided in accordance with exemplary embodiments of the present invention. Scores 34 are provided to inner layer in accordance with known technologies for example the teachings of U.S. Pat. No. 6,533,314 the contents of which are incorporated herein by reference thereto.

Figure 4:
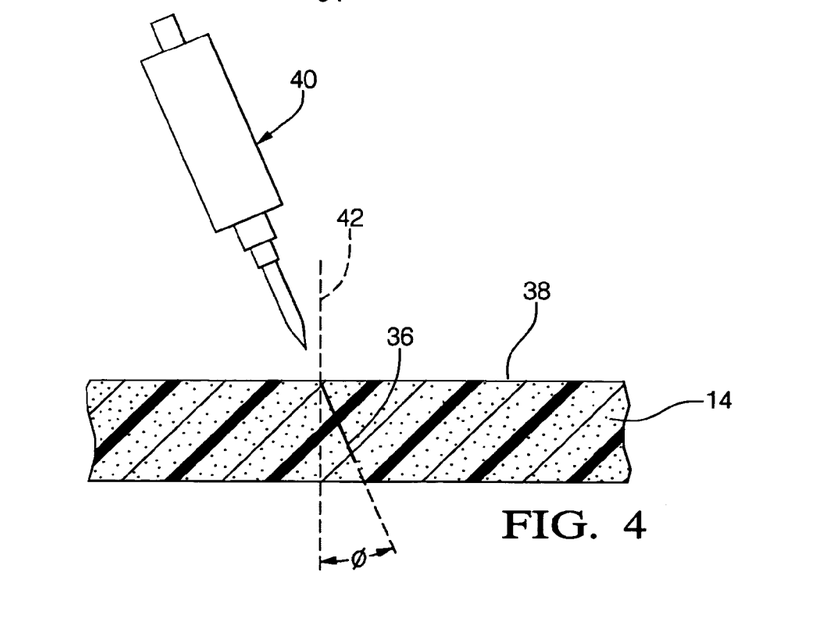
FIG. 4 is a cross sectional view of a portion of a first outer layer of an instrument panel formed in accordance with exemplary embodiments of the present invention.

Referring now to FIGS. 3 and 4 the method of making the invisible tear seam of exemplary embodiments of the present invention is illustrated. In a first step outer layer 14 is formed to provide a sheet of material for use as an exterior show surface of an instrument panel for a vehicle. The sheet of outer material is formed from materials including but not limited to polyurethane, poly vinyl chloride (PVC), imitation leather, real leather products and any other equivalent material capable of providing the desired show surface. Thus, a sheet of material having a show surface or an outer aesthetically pleasing appearance is provided. After the sheet of material is formed cuts 36 are made in an outer show surface 38 of first outer layer 14. It is noted that cuts 36 can be provided into layer 14 before, during and after the application of layers 16 and 18.

In an exemplary embodiment, show surface 38 of first outer layer 14 is configured to have a textured or grainy textured to provide an aesthetically pleasing appearance (e.g., a simulated leather texture).

Cuts 36 are provided by introducing a cutting means 40 such as a cutting knife, an oscillating cutting knife, wherein the knife is either heated or not and equivalents thereof. Cutting means cuts into the show surface but the cuts do not extend all the way through layer 14. In accordance with an exemplary embodiment of the present invention the cutting means is introduced into the show surface 38 as opposed to cutting from behind. The cutting means is also introduced at an angle $\theta$ with respect to a line 42 that would correspond to a direct incision that would be normal (e.g., 90 degrees) with respect to the horizontal plane of show surface 38. By making the cuts at this angle and through the show surface the cuts are not perceivable to the naked eye of the vehicle occupant thus, it is possible through exemplary embodiments of the present invention to provide an aesthetically pleasing show surface while cutting the same to provide a deployable door in the instrument panel.

It is also noted that this cutting angle $\theta$ is positioned to traverse away from the occupant as opposed to traversing towards the occupant. For example, the windshield illustrated by the dashed lines in FIG. 3 is traveling towards the occupant.

In accordance with an exemplary embodiment first outer layer 14 is not completely cut through by cutting means 40. Also, and in accordance with an exemplary embodiment the cuts of first outer layer 14 are at an angle $\theta$, which is approximately 20 degrees. Of course, other angles greater or less than 20 degrees are contemplated to be within the scope of the present invention. The cuts of first outer layer 14 will define the periphery of a portion of an outer door or doors formed in the instrument panel. A portion of the first outer layer will remain uncut to provide a hinging portion of the deployable door or doors. Alternatively, and if an alternative hinging means is provided, the entire door may be cut from first outer layer 14.

For example, a deployment region having a "U" shape is formed by cuts 36. Alternatively, a deployment region in the shape of an "H" or an "I" is formed by cuts 36. It being understood that these shapes for deployment region are merely exemplary and that many other shapes may be used to form deployment region. When choosing the pattern for the deployment region, some factors to consider include but are not limited to the mounting location of the air bag module (FIG. 1), how close a passenger seat is located relative to the instrument panel, how the inflatable cushion is folded and stored prior to deployment and how much force is required for the air bag cushion to break through the instrument panel.

The deployment region is formed in the instrument panel so that the inflatable cushion is orientated in front of a passenger seated in the passenger compartment. The instrument panel and more specifically the deployment region, is used to conceal the inflatable cushion in an aesthetically pleasing manner. The deployment region is formed in the instrument panel with appropriate alignment of the deployment region with the passenger side airbag module so that upon deployment of the inflating cushion the same is forced through the instrument panel at its weakest point. In other words, the inflatable cushion exerts pressure on the inner surface of the instrument panel and causes the deployable door to separate along the scores and cuts formed therein. The deployment region is sized and shaped so that the passenger side air bag cushion successfully deploys therethrough upon actuation. Accordingly, the size of the deployment region is dependent upon the size and shape of the inflatable cushion.

As mentioned above intermediary layer 16 is a polyurethane foam material or other equivalent materials exhibiting the desired characteristics (e.g., compressibility, resiliency and bondability to surface 44 of layer 14). Accordingly, intermediary layer 16 is applied to outer layer 14 in accordance with known technologies. In one contemplated combination both first outer layer 14 and intermediary layer 16 are both polyurethane materials. Of course, other combinations are contemplated in accordance with exemplary embodiments of the present invention. In addition, the foam consistency of intermediary layer 16 allows the same to be torn during deployment of the inflatable cushion.

After intermediary layer 16 is applied, inner layer 18 is applied and bonded to layer 16. Inner layer 18 is configured to have complimentary scores 34, which are applied into layer 18 and as an alternative extend completely through layer 18 into a portion of layer 16. Scores 34 are applied to inner layer 18 in accordance with known technologies (e.g., U.S. Pat. No. 6,533,314 or equivalents thereof).

Figure 5:
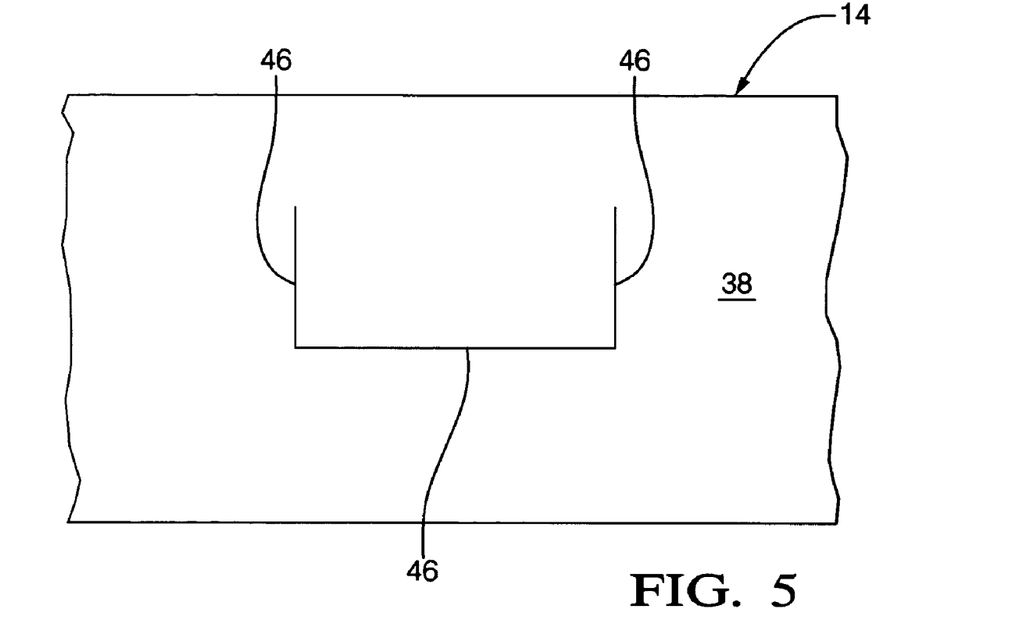
FIG. 5 is a top plan view of a portion of a first outer layer of an instrument panel formed in accordance with exemplary embodiments of the present invention.
Figure 6:
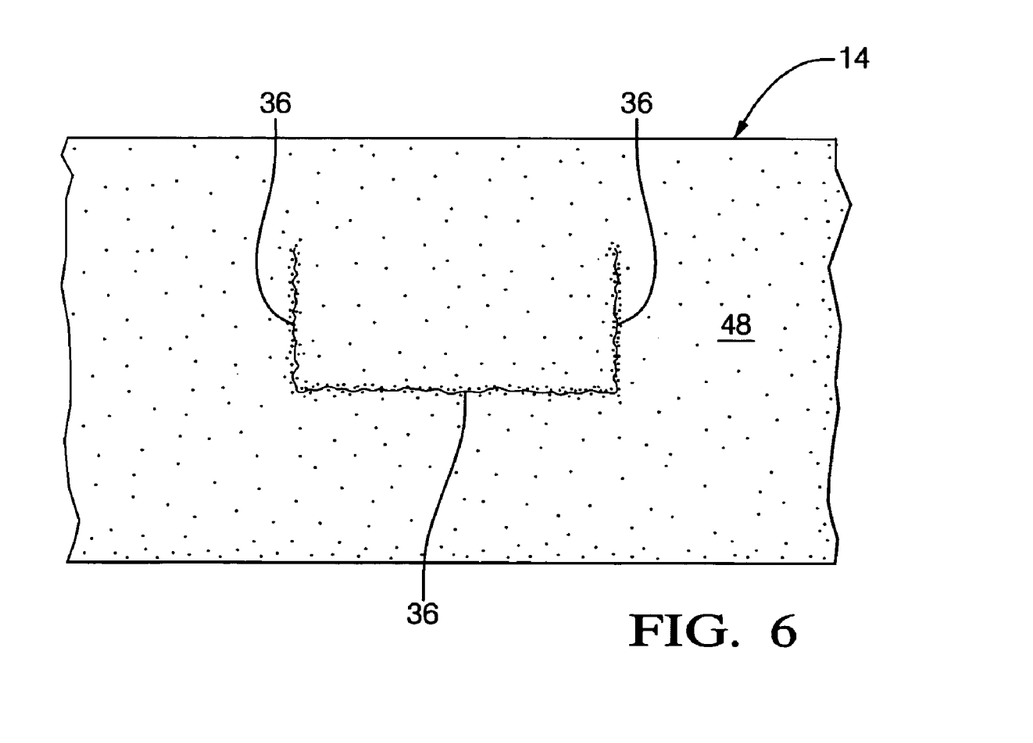
FIG. 6 is a top plan view of a portion of a first outer layer of an instrument panel formed in accordance with an alternative exemplary embodiment of the present invention.

In addition, and referring now to FIGS. 5 and 6, alternative exemplary embodiments are illustrated, here a top plan view of show surface 38 is illustrated, in this embodiment cuts 36 are made in either a linear (lines 46) or non-linear (lines 48) manner. In an exemplary embodiment, the non-linear cut in conjunction with a textured surface also helps to make the same non-perceivable to the naked eye of the vehicle occupant. Also, the irregularity of the non-linear cut may be a function of the cutting machine.

Figure 7:
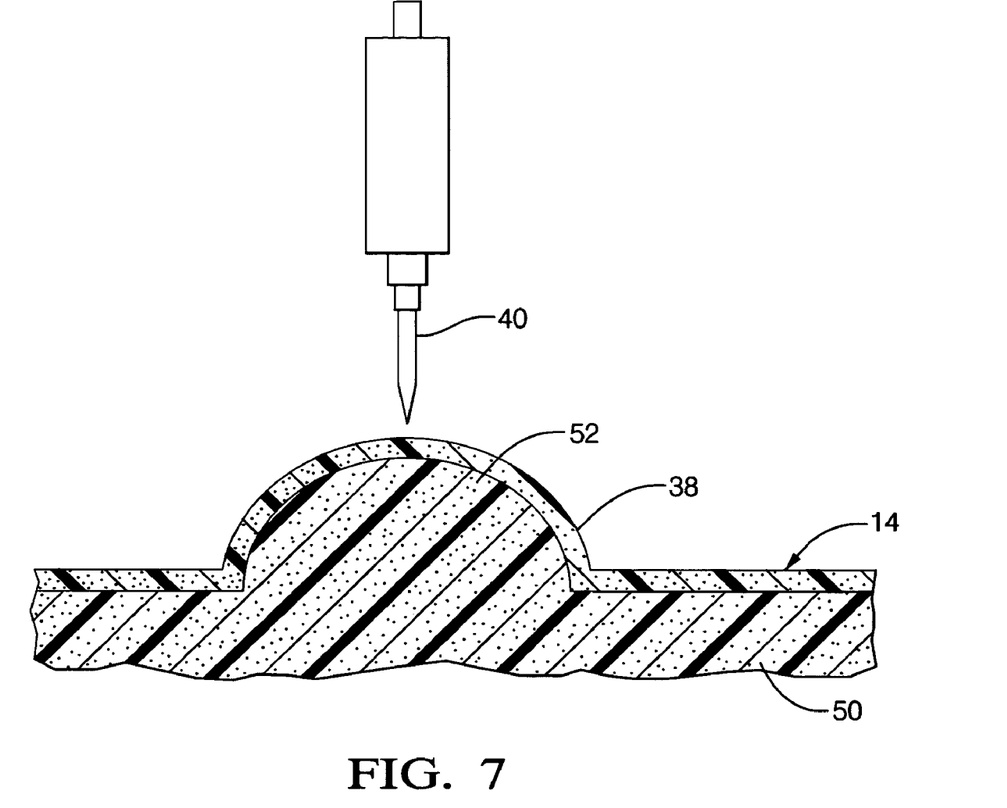
FIGS. 7–9 are cross sectional views illustrating the forming of a deployable door in a first outer layer of an instrument panel in accordance with exemplary embodiments of the present invention.
Figure 8:
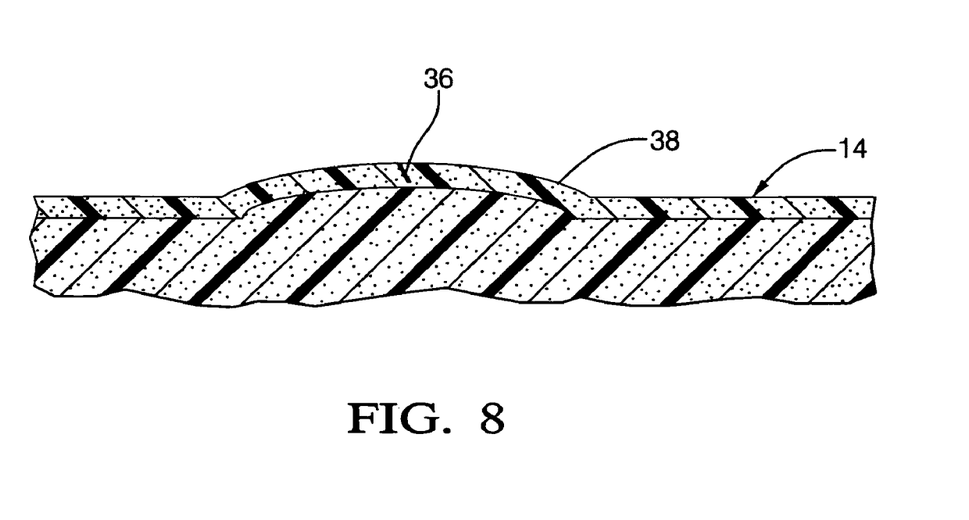
Figure 9:
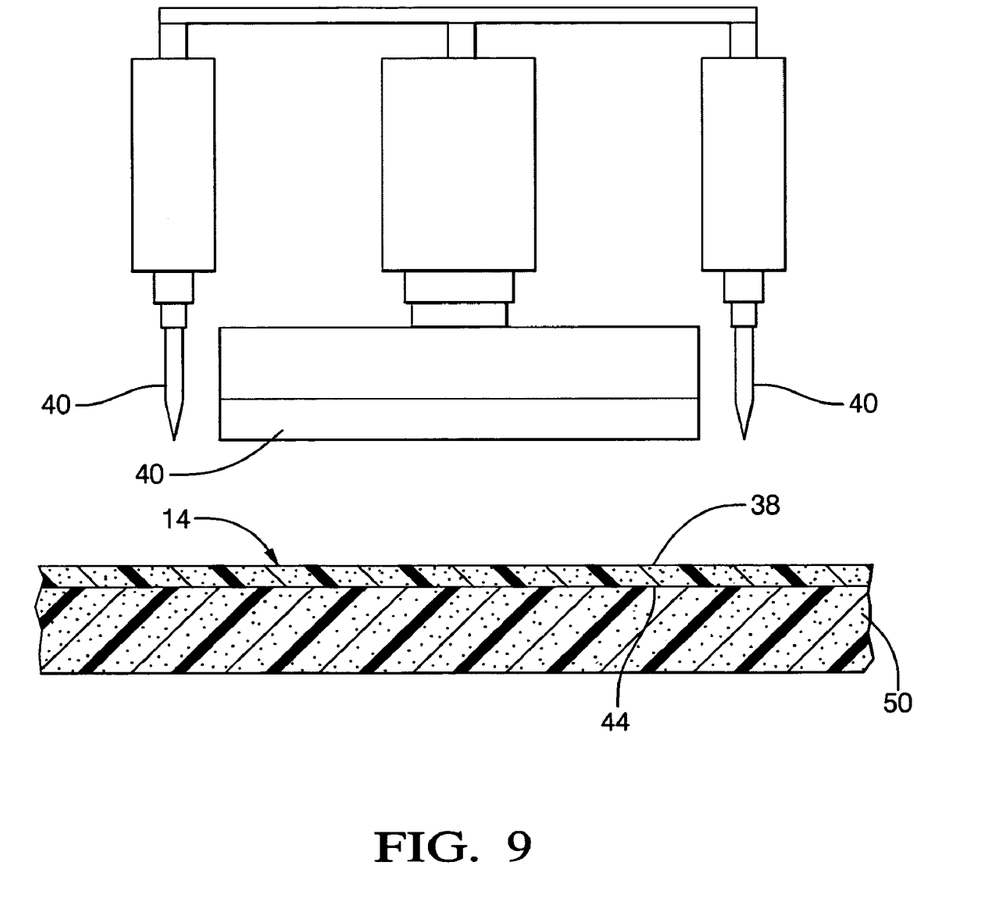

Referring now to FIGS. 7 and 8, yet another alternative exemplary embodiment of the present invention is illustrated. Here, first outer layer 14 is disposed over a mold or fixture 50 having a protrusion 52 having a curved configuration that is greater than a curved configuration of the instrument panel when it is installed in the vehicle.

Accordingly, the first outer layer is positioned on the mold and cuts 36 are made in the show surface of first outer layer 14 when the same is bent to an angular configuration corresponding to the mold and the bent angular configuration is greater than the angular configuration of the instrument panel when it is installed in a vehicle.

Therefore, first outer layer 14 is cut in a first bent configuration (FIG. 7) and the first layer is bent back to a configuration corresponding to the installed state (FIG. 8). Thereafter, layer 16 and 18 are applied. For example, the installed instrument panel may have a radius of curvature of 1 meter about a particular point corresponding to the deployable door and the same point is applied to mold 50 having a radius of curvature of ½ a meter. Thus, the first outer layer is bent to have a curve greater than a curve of its installed configuration. Of course, the aforementioned angles are merely provided as examples and the present invention is not intended to be limited by the same. In addition, and in yet another alternative embodiment cutting means 40 may not need to be angularly configured with respect to show surface 38 as the bending of first outer layer 14 about mold 50 provides the required angular cut.

In yet another alternative embodiment, layer 16 or layer 16 and 18 may be applied to first outer layer 14 before it is placed over fixture 50. This would, of course, depend on the flexibility and resiliency of layers 14 and 16 or the combination of layers 14, 16 and 18.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An instrument panel for use in a vehicle having a passenger side airbag module, the instrument panel comprising:
   a first outer layer having a show surface and an inner surface;
   an intermediary layer disposed on said inner surface;
   an inner layer disposed on said intermediary layer after it is disposed on said inner surface;
   a plurality of cuts in said show surface, said plurality of cuts defining a deployable door in the instrument panel, wherein said cuts are angularly offset from an axis that is normal to said show surface and do not extend completely through said first outer layer, whereby said plurality of cuts in said show surface are not visually perceivable.

2. The instrument panel as in claim 1, wherein said inner layer is configured to have a plurality of scores positioned in a similar arrangement as said plurality of cuts.

3. The instrument panel as in claim 2, wherein said plurality of scores are arranged in the shape of a "U".

4. The instrument panel as in claim 1, wherein inner layer is formed from a thermoplastic material and said intermediary layer is formed of a polyurethane foam and said first outer layer is formed of a polyurethane material.

5. The instrument panel as in claim 1, wherein said plurality of cuts are formed in a non-linear manner.

6. An instrument panel for use in a vehicle having a passenger side airbag module and a windshield, the instrument panel comprising:
   a first outer layer having a show surface and an inner surface;
   an intermediary layer disposed on said inner surface;
   an inner layer disposed on said intermediary layer after it is disposed on said inner surface;
   a plurality of cuts in said show surface, said plurality of cuts defining a deployable door in the instrument panel and do not extend completely through said first outer layer,
   wherein said plurality of cuts in said show surface are not visually perceivable and said plurality of cuts are angularly offset from an axis that is normal to said show surface, said plurality of cuts being configured to traverse angularly towards the windshield.

7. The instrument panel as in claim 6, wherein said inner layer is configured to have a plurality of scores positioned in a similar arrangement as said plurality of cuts.

8. The instrument panel as in claim 6, wherein said plurality of cuts are arranged in the shape of a "U".

9. The instrument panel as in claim 6, wherein inner layer is formed from a thermoplastic material and said intermediary layer is formed of a polyurethane foam and said first outer layer is formed of a polyurethane material.

10. The instrument panel as in claim 6, wherein said plurality of cuts are formed in a non-linear manner and said show surface is configured to have a textured surface.

11. A method of forming a hidden, integral passenger air bag door in an instrument panel, the method comprising:

providing a first outer layer having a show surface and an inner surface;

cutting a deployment door opening in said first outer layer by introducing a cutting device to said show surface in a direction angularly offset from an axis that is normal to said show surface to form a plurality of cuts that do not extend completely through the outer layer;

disposing an intermediary layer on said inner surface of said first outer layer;

disposing an inner layer on said intermediary layer after it is disposed on said inner surface;

wherein said plurality of cuts in said show surface are not visually perceivable.

12. The method as in claim 11, wherein said plurality of cuts are configured to angularly traverse towards a forward end of the vehicle when the instrument panel is installed in the vehicle.

* * * * *